3,037,031
DERIVATIVES OF 3-(2-AMINOALKYL)-5-INDOLOL AND PROCESS THEREFOR
Arnold D. Lewis, Livingston, N.J., assignor to Warner-Lambert Pharmaceutical Company, Morris Plains, N.J., a corporation of Delaware
No Drawing. Filed Aug. 4, 1959, Ser. No. 831,491
2 Claims. (Cl. 260—319)

This invention relates to a new and novel method of preparing compounds of the formula:

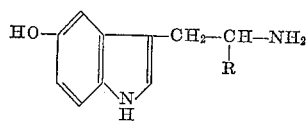

where R is methyl or ethyl and in particular to maleate salts of said compounds. The method of this invention is adapted to the preparation of 3-(2-aminopropyl)-5-indolol and 3-(2-aminobutyl)-5-indolol, also known as α-methyl- and α-ethyl serotonin, respectively.

Serotonin, that is 3-(2-aminoethyl)-5-indolol or 5-hydroxytryptamine, is known to occur in the body, and is known to influence the functioning of the central nervous, the gastrointestinal and the cardiovascular systems. It is also known that serotonin is readily oxidized within the body by the enzyme monoamineoxidase and it has been observed that the blood level of serotonin in a subject increases after the administration of monoamineoxidase inhibitors. Monoamineoxidase inhibitors such as β-phenethyl hydrazine have been subject to considerable investigation in recent years, in view of their ability to stimulate the central nervous system and thereby alleviate certain forms of mental depression.

Since serotonin is unstable in the body in the presence of the enzyme monoamineoxidase, administration of serotonin to a subject is not effective in influencing body functions.

It has, however, been observed that α-methyl and α-ethyl serotonins are not attacked by monoamineoxidase with the result that these compounds represent forms of serotonin which are stable in the body. Thus, the α-methyl and α-ethyl substituted serotonins remain intact after administration and accordingly are effective in treating mental disturbances associated with malfunctioning of the central nervous system.

Clinical studies on α-methyl and α-ethyl serotonins have been hampered heretofore because these compounds have not been available in sufficiently pure form for administration to patients. Attempts to purify these compounds by crystallization have met with failure and no pharmaceutically acceptable crystallizable salts of these compounds have heretofore been known.

It is, accordingly, a particular object of this invention to provide α-methyl and α-ethyl serotonin as pharaceutically acceptable salts in pure form.

It is another object of the present invention to provide a method for the production of α-methyl and α-ethyl serotonins.

Other objects and the advantages of the invention will become apparent from the following detailed description.

It has now been found that α-methyl and α-ethyl serotonins may be prepared by reacting p-benzyloxyphenylhydrazine hydrochloride with a nitroaliphatic aldehyde of the formula:

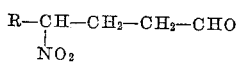

where R is methyl or ethyl to form a hydrazone of the formula:

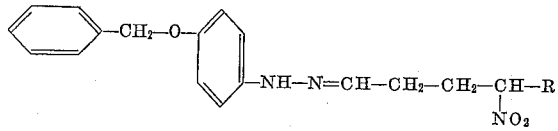

converting the hydrazone to a substituted indole of the formula:

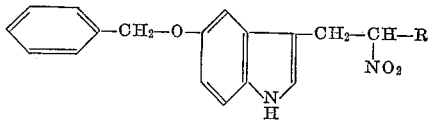

and finally simultaneously reducing the benzyloxy side chain to a hydroxyl group and the nitro group to an amino group to form the desired α-methyl or α-ethyl serotonin, depending upon the particular R substituent present in the nitroaliphatic aldehyde.

It has also been found that the crude α-methyl or α-ethyl serotonin contained in the reaction mixture after the reduction may be separated therefrom as maleate salts which may be crystallized to obtain α-methyl or α-ethyl serotonin maleates in pure form. These maleate salts of α-methyl and α-ethyl serotonins are pharmaceutically acceptable salts and their discovery permits the administration of α-methyl and α-ethyl serotonins to patients in the treatment and alleviation of certain depressed conditions of the central nervous system.

The initial step in the reaction sequence of the present invention involves the following reaction:

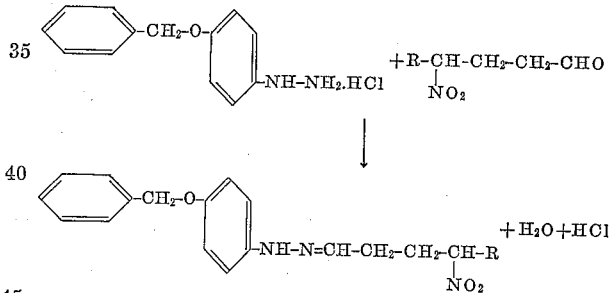

where R is methyl or ethyl. The starting materials are well-known organic chemicals and may be prepared by known methods of the prior art. The preparation of p-benzyloxyphenylhydrazine hydrochloride is described by Mentzer et al., Bull. Soc. Chm. France 24, 421 (1953). The nitroaliphatic aldehyde may be prepared by the procedure of Shechter et al. J.A.C.S. 74, 3664 (1952).

In the initial development of the reaction scheme of this invention it was found that p-benzyloxyphenylhydrazine was so unstable that its conversion to the desired hydrazone appeared to be impossible. It was then found that the hydrochloride derivative of the substituted hydrazine is a stable compound. However, this presented the further problem in that p-benzyloxyphenylhydrazine hydrochloride is insoluble in the nitroaliphatic aldehyde. It was finally discovered that an aqueous solution of a lower alkyl carboxylic acid is a suitable solvent for the reaction. Such carboxylic acids as formic, acetic, propionic and butyric acids at a concentration of about 40 to about 80 percent by weight in water are useful solvents. It has been found that 50 percent by weight aqueous acetic acid is a particularly effective solvent.

In carrying out the reaction the p-benzyloxyphenylhydrazine hydrochloride is dissolved in a large volume of the solvent by heating to a temperature in the range of about 30 to about 70° C. This solution is then thoroughly mixed with the nitroaliphatic aldehyde in the proportions of about 1 mol of aldehyde per mol of the substituted hydrazine hydrochloride and the mixture is allowed to stand overnight. The oil which forms in the reaction mixture is purified by extraction with a suitable solvent such as chloroform and the solvent is evaporated to yield a dark red oil which constitutes the desired hydrazone.

The second step in the reaction sequence of this invention involves the conversion of the hydrazone obtained in the first step to a substituted indole derivative in the presence of concentrated hydrochloric acid, as follows:

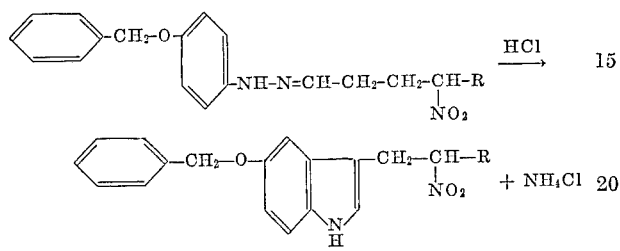

The hydrazone is dissolved in an aromatic solvent such as benzene, toluene, xylene and the like and the resulting solution is stirred vigorously with concentrated hydrochloric acid at room temperature for several hours. Under these conditions the long side chain of the hydrazone rearranges to form a substituted indole derivative.

The conversion of a substituted phenyl hydrazone to an indole derivative is known in the prior art and is generally referred to as the Fischer indole condensation reaction. If one attempts to carry out a Fischer indole condensation on the p-benzyloxyphenylhydrazone of a 4-nitro-4-alkyl butanal using such known Fischer indole condensation catalysts as concentrated sulfuric acid and zinc chloride, it is impossible to isolate any appreciable amounts of the desired 3-(2-alkyl-2-nitroethyl)-5-benzyloxyindole from the reaction mixture. The use of concentrated hydrochloric acid as a catalyst appears to be of critical importance in carrying out a Fischer indole condensation of the particular hydrazone in the reaction sequence of this invention.

At the conclusion of the indole condensation reaction, the aromatic solvent phase is processed for recovery of the desired indole derivative, for example, by chromatographic means through acid-washed alumina, followed by recrystallization of the product.

The third step of the reaction sequence of the present invention involves the conversion of the 3-(2-alkyl-2-nitroethyl)-5-benzyloxyindole to the desired α-alkyl serotonin, as follows:

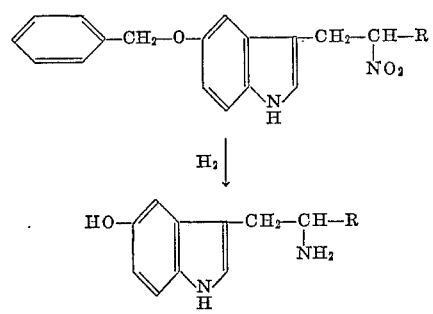

This reaction involves the simultaneous reduction of the benzyloxy group to a hydroxyl group and the nitro group to an amino group. The reaction may conveniently be carried out in a solvent solution by catalytic hydrogenation in the presence of a conventional hydrogenation catalyst, for example platinum, palladium and the like. Alternately, the reaction may be carried out in the presence of such conventional reducing agents as the alkali metal borohydrides, the alkali metal aluminum hydrides, the alkali metal alkoxides and the like. The particular reaction conditions are those normally used with such reagents.

At the conclusion of the reaction the reaction mixture is treated to free it from catalyst or reducing agent. This treatment is entirely conventional. For example, when catalytic hydrogenation has been employed, the reaction mixture may be filtered to remove residual catalyst. Where the reaction has been carried out with chemical reducing agents, the reaction mixture may be treated with water to decompose any free reducing agents remaining. The resulting solution may then be processed to recover the α-alkyl serotonin therefrom.

It is a particular feature of this invention that α-methyl or α-ethyl serotonins may be purified by formation of the maleate salts thereof since it has been found that maleate salts are crystallizable. They have the further advantage of representing pharmaceutically acceptable forms of these compounds which may be administered to patients in treatment.

In the initial work on the purification of α-methyl and α-ethyl serotonins it was believed that these compounds could be purified by recrystallization in the form of the same salts as used to purify serotonin. Serotonin is conventionally purified by crystallization as the creatinine sulfate salt. However, due to the unique solubility behavior of the creatinine sulfate salts of α-methyl and α-ethyl serotonins, it was discovered that these salts could not be purified by crystallization, the reason being that creatinine sulfate itself is less soluble than the creatinine sulfate salts of α-methyl and α-ethyl serotonins and therefore crystallizes from the solution first.

These α-alkyl serotonins can be isolated and purified as the corresponding picrate salts, but a picrate salt does not represent a pharmaceutically acceptable form of compound for administration to patients. Attempts to purify α-alkyl serotonins in the form of salts with such pharmaceutically acceptable acids as tartaric acid and citric acid proved unsuccessful. It was finally discovered that α-alkyl serotonins can be crystallized and purified to a high degree as salts with maleic acid. Accordingly pure α-ethyl and α-methyl serotonin maleates represent the first available pharmaceutically acceptable forms of α-ethyl and α-methyl serotonins for administration to patients.

The novel salts of α-methyl and α-ethyl serotonins of this invention may be combined with a conventional pharmaceutical carrier to form tablets, capsules, elixirs, solutions or suspensions for injection, suppositories and the like suitable for administration to patients.

The following example describing the preparation of α-methyl serotonin maleate is included in order further to illustrate the method of the present invention:

EXAMPLE

(a) P-Benzyloxyphenylhydrazone of 4-Nitropentanal

A quantity of 16.65 gms. (0.0664 mol) of p-benzyloxyphenylhydrazine hydrochloride is dissolved in 1435 ml. of 50 percent by weight aqueous acetic acid at a temperature of 50° C. 8.7 gms. (0.0664 mol) of 4-nitropentanal is added to the warm solution, the mixture is shaken until homogeneous and allowed to stand overnight. The insoluble reddish colored oil which forms is extracted with three 250 ml. portions of chloroform. The combined chloroform extracts are washed three times with 150 ml. portions of water and twice with 100 ml. portions of saturated aqueous sodium bicarbonate solution. The washed extract is dried over magnesium sulfate for one hour and then heated under vacuum to evaporate the chloroform to yield 17.66 grams of a dark red oil which constitutes the p-benzyloxyphenylhydrazone of 4-nitropentanal.

(b) 3-(2-Nitropropyl)-5-Benzyloxyindole

A quantity of 19.04 grams (0.0582 mol) of the p-benzyloxyphenylhydrazone of 4-nitropentanal prepared by the method described in (a) above is dissolved in 188 ml. benzene and 314 ml. 12 N HCl is added. The resulting mixture is stirred vigorously for 6 hours at room temperature. The mixture is filtered through a medium porosity sintered glass funnel. The acid layer is removed and extracted twice with 100 ml. portions of benzene. These benzene extracts are combined with the benzene layer of the filtered reaction mixture. The resulting benzene solution is washed with 80 ml. water, then with 80 ml. of 5 percent by weight aqueous sodium bicarbonate solution and finally dried over anhydrous magnesium sulfate.

The dried benzene solution is concentrated under vacuum to a volume of 100 ml. and chromatographed through 250 gms. of acid-washed alumina. The eluate from the column is collected immediately following the dark brown band which proceeds down the column. Benzene is continuously added at the top of the column until the solids content of the eluate becomes negligible. The eluate is then evaporated to dryness under vacuum to yield 9.1 gms. of crude 3-(2-nitropropyl)-5-benzyloxyindole. Recrystallization of the crude product from 40 ml. methanol yields 5.65 gms. of pure product. M.P.=81–83° C. Calculated elemental analysis for 3-(2-nitropropyl)-5-benzyloxyindole, $C_{18}H_{18}N_2O_3$:

Percent:  C–69.66  H–5.85  N–9.03
Found:    C–69.69  H–6.04  N–9.22

(c) 3-(2-Aminopropyl)-5-Indolol; α-Methyl Serotonin

A quantity of 4.70 gms. (0.01515 mol) of the 3-(2-nitropropyl)-5-benzyloxyindole, prepared as described in (b) above, is dissolved in 75 ml. absolute ethanol and reduced at 50 pounds per square inch hydrogen pressure in the presence of 0.80 gm. of 10 percent palladium on charcoal catalyst. At the end of 6.5 hours, 97 percent of the theoretical amount of hydrogen has been absorbed. The reaction mixture is filtered free of catalyst and evaporated to dryness under vacuum to yield 3.03 gms. of crude 3-(2-aminopropyl)-5-indolol or α-methyl serotonin.

(d) α-Methyl Serotonin Maleate

The crude α-methyl serotonin obtained as described in (c) above is dissolved in 15 ml. methanol at 50° C. A solution of 2.03 gms. maleic acid in 5 ml. methanol at 50° C. is added. The resulting mixture is stirred gently at 50° C. for 5 minutes in the presence of charcoal and then is filtered and the filtrate allowed to cool slowly to 0° C. The crystals are recovered by filtration, washed with methanol and dried to yield 2.15 gms. of α-methyl serotonin maleate, M.P. 186–187° C. Recrystallization from methanol raises the melting point to 186.5–187° C. Calculated elemental analysis for α-methyl serotonin maleate, $C_{11}H_{14}N_2O \cdot C_4H_4O_4$:

Percent:  C–58.81  H–5.92  N–9.15
Found:    C–58.78  H–6.03  N–9.22

The foregoing example describes the preparation of α-methyl serotonin and its purification as the maleate salt in accordance with the method of this invention. By use of 4-nitrohexanal in step (a), the method is adapted to the preparation of α-ethyl serotonin which may be purified as the corresponding maleate salt.

It is understood that the foregoing detailed description is given merely by way of illustration and that many variations may be made therein without departing from the spirit of my invention.

Having described my invention, what I desire to secure by Letters Patent is:

I claim:

1. A method of preparing a 3-(2-aminoalkyl)-5-indolol of the formula:

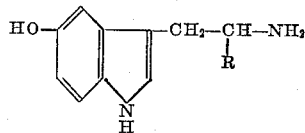

wherein R is selected from the group consisting of methyl and ethyl which comprises dissolving p-benzyloxyphenylhydrazine hydrochrolide in an aqueous solution of a lower alkyl carboxylic acid containing about 40 to about 80 percent by weight of said acid, adding to the resulting soltuion and mixing therewith an aldehyde of the formula:

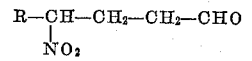

separating from the reaction mixture a hydrazone of the formula:

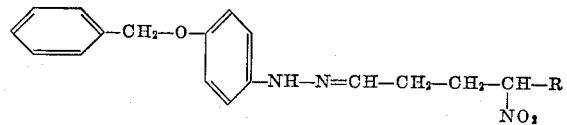

dissolving said hydrazone in an inert aromatic solvent, stirring said hydrazone solution with concentrated hydrochloric acid to form a 3-(2-nitroalkyl)-5-benzyloxyindole of the formula:

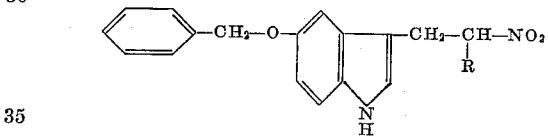

recovering said 3-(2-nitralkyl)-5-benzyloxyindole from the organic phase and treating said 3-(2-nitroalkyl)-5-benzyloxyindole with a reducing agent capable of converting a nitro group to an amino group to form said 3-(2-aminoalkyl)-5-indolol.

2. A method of preparing 3-(2-aminopropyl)-5-indolol which comprises dissolving p-benzyloxyphenylhydrazine hydrochloride in an aqueous acetic acid solution containing about 50 percent of said acetic acid by weight, adding to the resulting solution and mixing therewith 4-nitropentanal, separating from the reaction mixture the resulting 5-benzyloxyphenylhydrazone of 4-nitropentanal, dissolving said hydrazone in benzene, stirring said benzene solution with concentrated hydrachloric acid, recovering the resulting 3-(2-nitropropyl)-5-benzyloxyindole from the organic phase and hydrogenating said 3-(2-nitropropyl)-5-benzyloxyindole in the presence of a palladium on charcoal catalyst to form said 3-(2-aminopropyl)-5-indolol.

References Cited in the file of this patent

UNITED STATES PATENTS

| | | |
|---|---|---|
| 2,708,197 | Speeter | May 10, 1955 |
| 2,855,398 | Voegtl | Oct. 7, 1958 |
| 2,908,691 | Robinson | Oct. 13, 1959 |

FOREIGN PATENTS

| | | |
|---|---|---|
| 721,171 | Great Britain | Dec. 29, 1954 |
| 807,877 | Great Britain | Jan. 21, 1959 |

OTHER REFERENCES

Speeter et al.: J. American Chemical Society, vol. 73, pages 5514–5 (1951).

Shaw et al.: J. American Chemical Society, vol. 75, pp. 1877–1880 (1953).

Noland et al.: J. American Chemical Society, vol. 76, pp. 3227–28 (1954).